Figure 1:
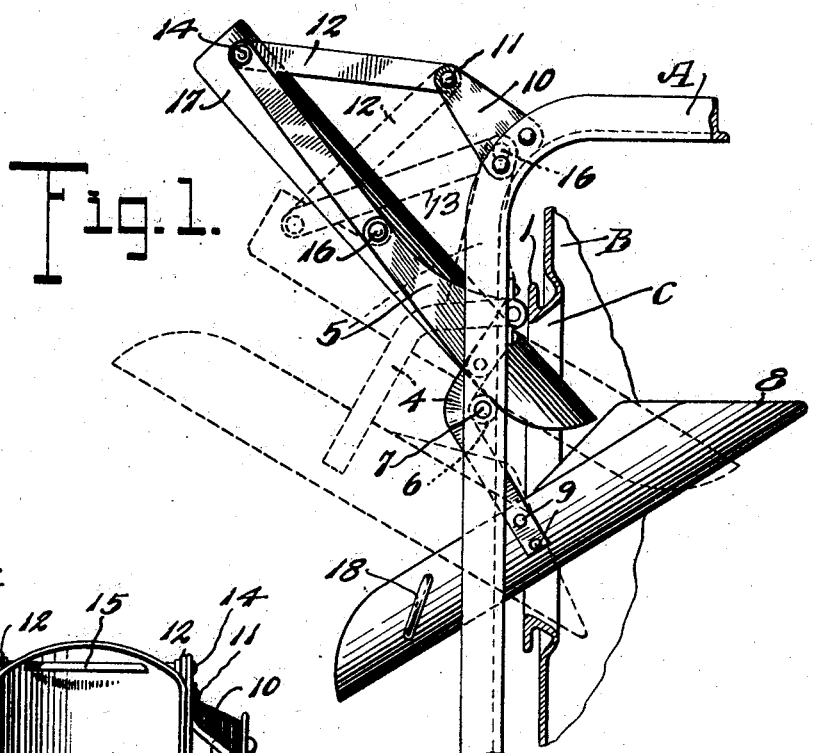

May 20, 1930.  J. DANIEL  1,759,807
DISCHARGE CHUTE AND DEFLECTOR

Filed June 23, 1928

Inventor
John Daniel
By Robb & Robb
Attorneys

Patented May 20, 1930

1,759,807

UNITED STATES PATENT OFFICE

JOHN DANIEL, OF MILWAUKEE, WISCONSIN, ASSIGNOR TO KOEHRING COMPANY, OF MILWAUKEE, WISCONSIN, A CORPORATION

DISCHARGE CHUTE AND DEFLECTOR

Application filed June 23, 1928. Serial No. 287,677.

This invention has to do with the art of concrete mixing machines and more particularly aims at the provision of novel improvements in the discharge means conventionally employed in conjunction with mixing drums of the constantly rotating type.

It is almost universal practice in this art to make use of a discharge chute which is moved into and out of discharging position either under manual effort or by the application of power thereto. However, this operation of the discharge chute is carried out only with a considerable expenditure of energy, this being true partially on account of the action of the aggregates being mixed inside the mixing drum on the chute.

An object in view is the provision of means for making possible the operation of the discharge chute as above noted, with a minimum expenditure of work and effort. In carrying out this idea, I avail myself of a pivoted chute and employ in connection therewith counter-balancing means so that in any position the discharge chute is always counter-balanced by the means aforesaid, and in order to move the former, it is not necessary to do so against the force of gravity, this last named element being discounted by the counter-balancing arrangement.

It is conventional practice in this art to make use of the discharge chute as a sealing device for the discharge opening of the mixing drum when the latter is being rotated for mixing action. Under these conditions the discharge chute is moved into a position wherein it partially closes this opening and in which position aggregates thrown thereon are passed back into the drum. This invention contemplates the provision of a discharge chute of this character with which is associated a supplemental sealing device for closing the discharge opening of the drum during mixing action, and which device is movable coincident with movement of the discharge chute into operative position out of sealing position to permit discharge of the contents of the drum. In carrying out this idea in a practical embodiment of my invention, I avail myself of a member which is of substantially the same construction as the discharge chute and which member is operatively connected with the discharge chute by toggle connections so that it is movable coincident therewith and which member furthermore assumes a position wherein it functions as an awning or canopy that seals the discharge opening and the discharge chute during mixing operations of the mixing drum.

It is a noteworthy feature of my invention that the sealing device noted in the preceding paragraph also constitutes the counter-balancing means hereinbefore specified. It is apparent, therefore, that not only is a discharge chute provided which is movable into discharging and non-discharging positions with little or no effort, but which also affords a heretofore unobtainable sealing effect at the discharge opening.

A somewhat more detailed object of the invention is to provide means for limiting the movement of the discharge chute into and out of discharging position. In view of the counter-balancing arrangemet provided hereby, it is of essential importance that suitable means be included in the construction to inhibit uncalled for movements of the parts in either direction, and to this end the construction includes a bar member which acts as a limiting means for movement of the discharge chute into non-discharging position while certain portions of the toggle arrangement function to limit movement in the opposite direction.

With these and other objects and advantages in view as will in part become apparent and in part be hereinafter stated, the invention comprises certain novel constructions, combinations, and arrangements of parts as will be subsequently specified and claimed.

For a full and more complete understanding of the invention, reference may be had to the following description and accompanying drawings, in which—

Figure 2:
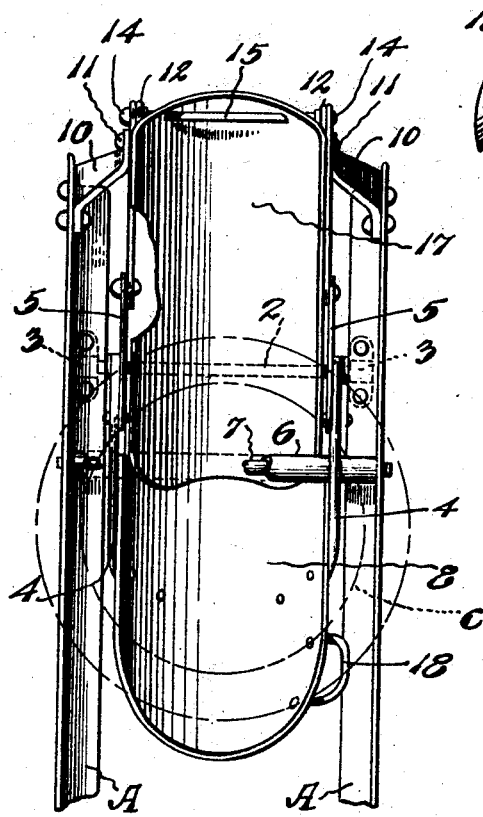

Figure 1 is a view in side elevation of my novel discharge chute device as applied to a mixing drum, the showing of the latter being fragmentary and partially in section, discharging position being brought out by the full lines with the dotted lines indicating non-discharging position of the device, and Figure 2 is a front view of my device as applied to a mixing drum when in discharging position.

While a preferred specific embodiment of the invention is herein set forth, it is to be understood that I am not to be limited to the exact constructions illustrated and described because various modifications of these details may be provided in putting the invention into practice within the purview of the appended claims.

Referring now to the drawings, a portion of the frame work of a mixing machine is shown in Figure 1 and designated by the reference character A. This frame work rotatably supports a mixing drum shown fragmentarily at B in any well known manner. Mixing drum B is provided with a discharge opening C which is defined by a turned over flange or lip construction shown at 1. A bar 2 extends transversely between the frame element A approximately just above the uppermost point of the opening B and its ends are journaled in bearing elements 3. These last named parts are shown in dotted lines in Figure 2. At opposite ends of the bar 2 are shaped hanger members 4 which have rigidly affixed thereto at their upper end adjacent to their pivotal mountings, plates 5 which are in effect integral with these angular hanger members. A roller member 6 is carried by an axial supporting shaft 7 and is disposed to lie in the crotch of the members 4 when the latter is swung inwardly, and this manner constitutes a limiting means for inner movement of these hangers.

The hangers 4 carry rigid at their lower extremity, a discharge chute 8 which is of conventional trough-like construction. This chute 8 is rigidly supported between the hangers 4 and attached thereto in any suitable manner such as by the bolt or rivet arrangement indicated at 9.

The frame work A has mounted thereon at the upper portion thereof, bracket members 10 which are offset inwardly as clearly shown in Figure 2 to provide ears 11. Pivoted to these ears 11 are the ends of toggle constructions comprising in one instance arms 12 and 13 on one side of the machine and on the other side of the machine a duplicate construction. The arms 12 and 13 are pivotally joined at 14 by a cross bar 15 which extends transversely and constitutes a like pivotal connection with the toggle on the other side of the machine. This bar also functions to render the two toggle constructions unitary and their operation simultaneous. The free end of the bar 13 is pivotally connected to the plate 5 as shown at 16, and it is apparent that movement of the plates 5 will cause operations of the toggles comprising members 12 and 13.

A counter-balancing and sealing member 17 is supported between the toggles at their pivotal connection 14 by the bar 15 and its other end extends between the roller 6 and bar 2, which last named parts control and guide the member 17 in its so-called sliding movement. This member 17 is of somewhat the same construction and design as the chute 8. Any suitable grappling means for effecting movement of the discharge chute 8 may be provided such as a handle indicated at 18.

The operation of the discharge and sealing device hereinbefore described is thought to be almost self-evident. With the discharge chute in full line position of Figure 1, it is noted that the member 17 does not in any way obstruct the flow of aggregates onto the chute 8. Upon movement of the discharge chute 8 into the dotted line position of Figure 1 which is caused by manual operation through the medium of the handle 18 and which operation is rendered easy and not entailing an undue expense of effort on account of the counterbalancing effect provided by the chute 17 which, during such movement of the chute 8 against the force of gravity, falls under the influence of gravity into the dotted line position of Figure 1, its assumption of this position being due to the toggle construction 12 and 13 and the guiding means in the form of the bar 2 and roller 6. In this dotted line position, it is noted that the member 17 functions as an awning for the discharge opening C and prevents any aggregates being mixed from falling onto the discharge chute 8, or in fact from passing through the opening C in any manner.

It is also important to note that the combination counterbalancing and sealing member 17 also has another function. In the dotted line position of Figure 1, this member is shown extending into the mixing drum whereby it participates in the mixing of the aggregates. Another novel feature of the construction as hereinbefore set forth is that the discharge chute and the counterbalancing and sealing member cooperate in such a manner that as the discharge chute moves to non-discharging position, the sealing member advances over the mouth of the discharge chute to cut off the supply of aggregates thereto. In other words, there is a relation between the discharge chute and sealing means whereby the degree to which the aggregates are prevented from entering the discharge chute is dependent upon the position of the discharge chute at that particular instant and ranges from no prevention at all when the discharge chute is in discharge position, to a complete prevention when the discharge chute is in non-discharge position.

Having thus described my invention, what I claim as new and desire to secure by Letters Patent of the United States, is—

1. The combination with a mixing drum of the constantly rotating type having a discharge opening of a discharge device therefore including counter-balancing means for minimizing the effort necessary to operate the discharge device and which counter-balancing means also constitutes a sealing device for the discharge opening of the drum.

2. The combination with a mixing drum having a discharge opening, of a discharge device for the opening adapted to move into discharging and non-discharging positions, said device including counter-balancing means, and means for limiting the movements of the parts of the device in opposite directions, one of said means constituting a guiding member for the counter-balancing means, said member comprising a roller mounted on a fixed shaft.

3. A discharge device of the class described, comprising, in combination, a mixing drum having a discharge opening, angularly shaped hanger members pivotally mounted on the frame work of a mixing machine, a discharge chute carried by the hanger members and adapted to assume discharging and non-discharging positions, means for limiting movement of the discharge chute, and counter-balancing means for minimizing the efforts necessary to operate the discharge chute and which counter-balancing means also constitutes a sealing device for the discharge opening.

4. A discharge device of the class described, comprising, in combination, a mixing drum having a discharge opening, a pivotally mounted discharge chute movable into discharging and non-discharging positions, a member operatively connected with the discharge chute and movable coincident with movements of the latter, said member being connected with the discharge chute by toggle constructions and constituting a sealing device for the discharge opening.

5. The combination with a mixing drum having a discharge opening, of a discharge device therefor, and counter-balancing means for the discharge device, the counter-balancing means being adapted to move into the mixing drum and participate in the mixing function of the latter.

6. The combination with a mixing drum having a discharge opening, of a discharge device movable into discharge and non-discharge positions, a sealing means therefor, means to move the sealing means into the drum over the end of the discharge device incident to movement of the discharge device from discharge to non-discharge positions, and means to hold the sealing means in the drum so as to constitute a mixing member that helps mix the materials in the drum when in sealing position.

7. A discharge device of the class described, comprising, in combination, a mixing drum having a discharge opening, hanger members pivoted to the frame of a mixing machine, a discharge chute carried by the hanger members and adapted to move into discharge and non-discharge positions, means for limiting the movement of the discharge chute into discharge position, a sealing device guided by said last named means and adapted to move into the mixing drum, a supporting member pivoted to the frame aforementioned and to the sealing device, and means for causing the sealing device to move into and out of the mixing drum incident to movement of the discharge chute.

In testimony whereof I affix my signature.

JOHN DANIEL.